United States Patent [19]
Admiraal

[11] Patent Number: 5,301,731
[45] Date of Patent: Apr. 12, 1994

[54] APPARATUS FOR MOUNTING SPOKES BETWEEN A HUB AND RIM OF A SPOKE WHEEL

[75] Inventor: Anthonius S. Admiraal, Limmen, Netherlands

[73] Assignee: Holland Mechanics B.V., Netherlands

[21] Appl. No.: 32,505

[22] Filed: Mar. 17, 1993

[30] Foreign Application Priority Data

Mar. 18, 1992 [NL] Netherlands .......................... 9200503
Nov. 13, 1992 [NL] Netherlands .......................... 9201986

[51] Int. Cl.$^5$ .............................................. B21K 1/34
[52] U.S. Cl. .................................................. 157/1.55
[58] Field of Search ................ 81/54, 57.44; 157/1.5, 157/1.55

[56] References Cited
U.S. PATENT DOCUMENTS

3,636,614  1/1972  Damman et al. ................ 157/1.54
5,193,594  3/1993  Plaatsman ........................ 157/1.55

Primary Examiner—James G. Smith
Attorney, Agent, or Firm—Wolf, Greenfield & Sacks

[57] ABSTRACT

An apparatus for mounting spokes between a hub and rim of a spoke wheel comprises a hub support for rotatably supporting the hub and rim support rollers for supporting the rim concentrically around its axis. Motor driven rim rollers cause the rim to rotate about its axis. At least one rotatably driven, substantially radially directed screw driver is arranged for screwing nipples onto corresponding spokes through nipple holes in the rim. A CCD-camera and a measuring wheel are positioned near the screw driver for determining the position of the nipple holes in the rim. Control means serve to control the drive means for successively positioning nipple holes in front of the screw driver. The rim rollers for driving the rim are arranged at a small distance from the screw driver so as to minimize the disturbing movements of the rim at the position of the screw driver.

10 Claims, 2 Drawing Sheets

APPARATUS FOR MOUNTING SPOKES BETWEEN A HUB AND RIM OF A SPOKE WHEEL

BACKGROUND OF THE INVENTION

The invention relates to an apparatus for mounting spokes between a hub and rim of a spoke wheel, comprising a hub support for rotatably supporting the hub, rim support rollers for supporting the rim concentrically around its axis, drive means for rotating the rim about its axis, at least a rotatably driven, substantially radially directed screw driver for screwing nipples onto corresponding spokes through the respective nipple holes in the rim, measuring means near the screw driver for determining the position of the nipple holes in the rim, and control means for controlling the drive means such that the nipple holes are successively positioned in front of the screw driver.

Such an apparatus is described, for example, in European patent application 0 476 750 of applicant. In this apparatus the rim drive means consist of rim rollers adapted to engage the rim diametrically opposite the screw driver. It is found, however, that when the rim is driven on one side, the deformation and irregular shape of the rim cause it to not rotate truly about a center and the displacement of the rim on the other side is different from that at the position of the drive means. This difference will be corrected by the control which will take time, however, so that the contemplated high operational speed will not be obtained.

SUMMARY OF THE INVENTION

The object of the present invention is to provide an apparatus of the type mentioned in the preamble, in which this disadvantage is removed in a simple but effective way.

For this purpose, the apparatus according to the invention is characterized in that the drive means for the rim is arranged at a small distance from the screw driver.

Due to this arrangement of the rim drive means there is only a small rim length between the drive means and the screw driver or measuring means, respectively, so that displacements of the center of rotation of the rim does not cause uncontrollable disturbing movements at the position of the screw driver and measuring means and, as a result, it is possible to position the nipples of the rim accurately in front of the screw driver with higher speeds.

Preferably, said distance between drive means and screw driver is as small as possible, but in any case less than 90° length of arc. This length of arc may vary when the apparatus is adjusted to different rim diameters. A decrease of the rim diameter might increase the angle.

Preferably, the drive means is adapted to drive the rim in a direction to the screw driver, and the drive means includes two opposed rim rollers adapted to engage opposite sides of the rim, in which case it is desirable that the axis of the rim rollers makes an angle with the radial line through the hub support and the rim rollers lying on the side of the screw driver.

Due to said latter arrangement of the rim rollers, the lateral slip between the rim rollers and the rim exerts an additional pressure force onto the rim in the direction to the screw driver thereby ensuring a proper abutment of the rim to the rim roller(s) present there.

It is favorable if one of the rim support rollers, which supports the rim at least axially, is arranged at the position of the screw driver. This position of the rim support has the advantage that any distortion of the rim during the spoke plaiting operation does not cause an axial displacement at the position of the screw driver so that it is not necessary to make corrections to the preceding position fixation by the measuring means.

The invention will hereafter be elucidated with reference to the drawings showing very schematically an embodiment of the invention by way of example.

DETAILED DESCRIPTION

Figure 1:
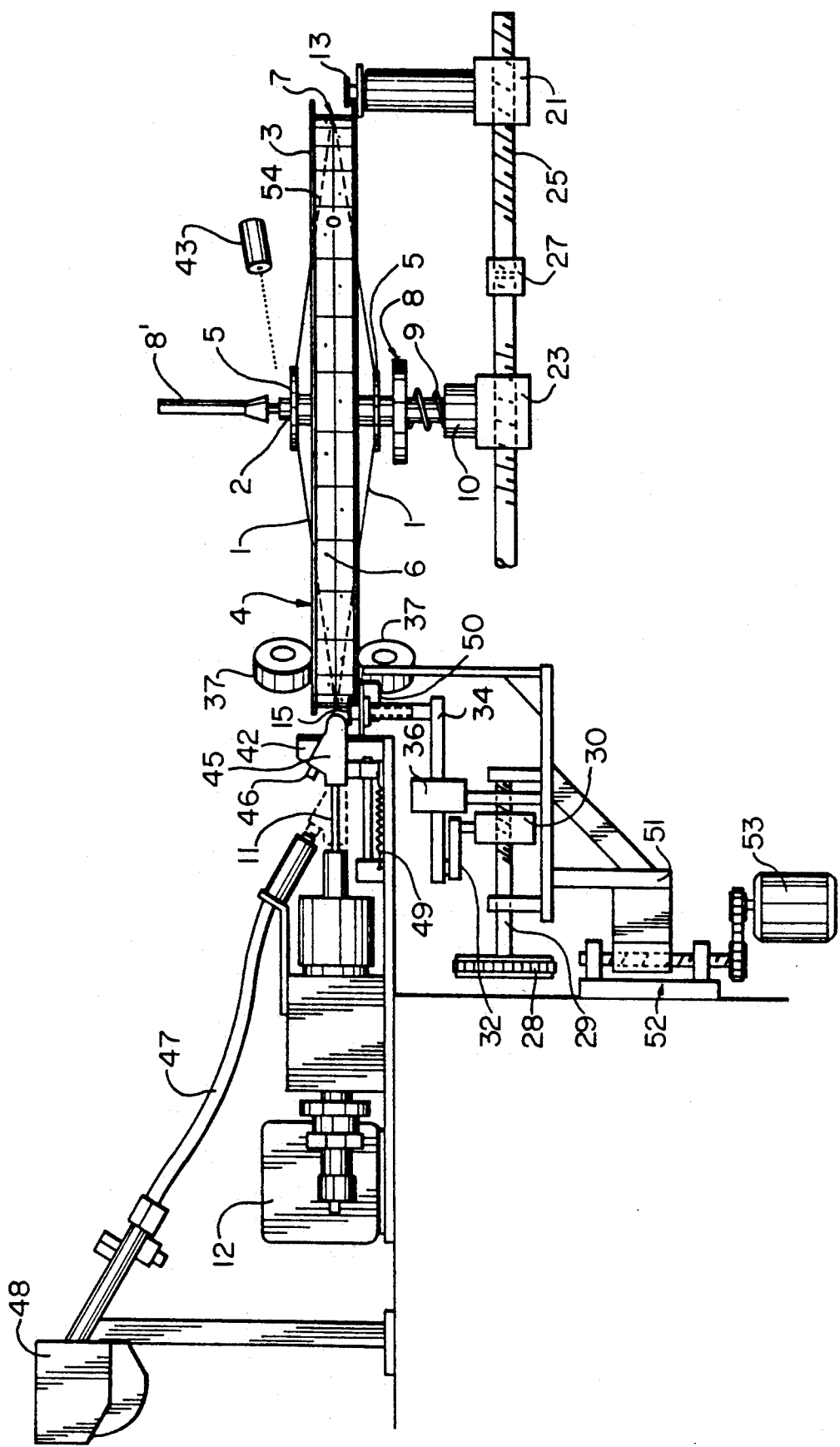
FIG. 1 is a very schematic side view of the exemplary embodiment of the apparatus according to the invention, wherein a number of parts is omitted for the sake of clarity.

The drawings show an apparatus for mounting spokes 1 between a hub 2 and a rim 3 of a spoke wheel 4. It is intended that the spokes 1, which are inserted in one of the flanges 5 of the hub, are positioned with their end carrying screw threads in front of or into a respective nipple hole 6 in the rim 3 whereafter a nipple 7 is screwed on through the hole 6 and onto the screw threads of each spoke 1. The spokes can be divided into two groups, the spokes 1 of one group should be connected to one flange 5 of the hub 2, while the spokes 1 of the other group should be brought in connection with the other flange 5 of the hub 2. The spokes 1 of both of these groups are alternately arranged in the rim 3. The apparatus according to the invention comprises a hub support 8 mounted to a carrier 10 by means of an adjustable spring 9. The hub 2 of the spoke wheel 4 lies freely movable and rotatable in the hub support 8, the hub being kept upright by a flexible hub 8' which is swung aside when the hub 2 is introduced or removed.

On one side of the hub support 8 is arranged a screw driver 11 in a substantially radial position (i.e., aligned with the spokes of the wheel), said screw driver being driven by an electric motor 12. This screw driver is used to screw the nipple 7 through the nipple hole 6 onto the screw threads of the respective spoke 1 in order to mount this spoke between the hub 2 and the rim 3.

The rim may be supported within the apparatus both axially and radially by a first rim support roller 13 positioned diametrically opposite the screw driver 11, two rim support rollers 14 and 15 arranged on either side of the screw driver 11, and a rim support roller 50 at the position of the screw driver 11. The rim support roller 13 is rotatably supported by a bell crank lever 17 rotatable about a vertical pivot 16 and carried by a carrier 18 and resiliently supported by a spring 19 causing the rim support roller 13 to load the rim 3 in the direction to the screw driver 11. The bell crank lever 17 may be locked by means of an air cylinder 20 at the time that the screw driver 11 screws a nipple 7 onto the respective spoke 1. The carrier 18 for the rim support roller 13 is mounted on an adjusting nut 21 which is displaceable by a straight guide 22 in a direction parallel to the plane through the rim support roller 13, the hub support 8 and the screw driver 11. Also the carrier 10 for the hub support 8 is mounted on an adjusting nut 23 slidable along the straight guide 22. The drive of the adjusting nuts 21 and 23, which should be actuated when the hub support 8 and the rim support roller 13 are adjusted to a rim 3 having another rim diameter, consists of a first lead screw 25 and a second lead screw 26 rotatably drivable by an electric motor 24 and connected by a coupling means 27 and being in engagement with the adjusting nuts 21, 23 respectively. The lead screw 25 for the rim support roller 13 has a pitch which is twice that of the lead screw 26 of the hub support 8. As a result the rim support roller 13 will be displaced with a double speed in relation to the hub support 8 when the electric motor 24 is rotated and in this simple manner it is obtained that the hub support is always positioned in the middle between the rim support roller 13 and the screw driver 11 without regard to the rim diameter.

The rim support rollers 14 and 15 are displaced by an electric motor 53 when the apparatus is adjusted to a rim 3 having another diameter. For this purpose, the electric motor 53 is coupled with a lead screw 29 through a geared belt transmission 28. The lead screw 29 cooperates with an adjusting nut 30 which, through arms 31, 32, may rotate levers 33, 34 of the rim support rollers 14 and 15 about corresponding fixed pivots 35, 36 respectively for adjusting the position of the rim support rollers 14 and 15 with different rim diameters.

Of the rim support rollers 13, 14, 15 and 50, the rim support rollers 13 and 14 support the rim 3 both axially and radially, while the rim support roller 50 supports the rim 3 only in the radial direction because this roller is mounted freely or resiliently movable in the axial direction. As a result, the rim 3 is supported in the axial direction in only three points. The rim support roller 50, which is rotatable about a horizontal axis standing radially in relation to the rim 3, supports the rim 3 only axially at the position of the screw driver 11 whereby an axial wobble or distortion of the rim 3 caused when the spokes 1 are mounted does not cause an axial displacement of that rim part lying in front of the screw driver in relation to this screw driver 11. This has the advantage that a preceding position fixation of the nipple holes 6 in the rim 3 (which will be described later on) is not disturbed by an axial displacement of nipple holes 6 after the measurement. After all, due to the axial support of the rim 3 by means of the rim support roller 50 at the position of the screw driver 11 this distortion of the rim 3 will not be revealed to the screw driver 11 and the positions as measured do not have to be corrected. The rim support rollers 14, 15 and 50 are adjusted in common in vertical direction by a support 51 having a vertical drive 52.

Figure 2:
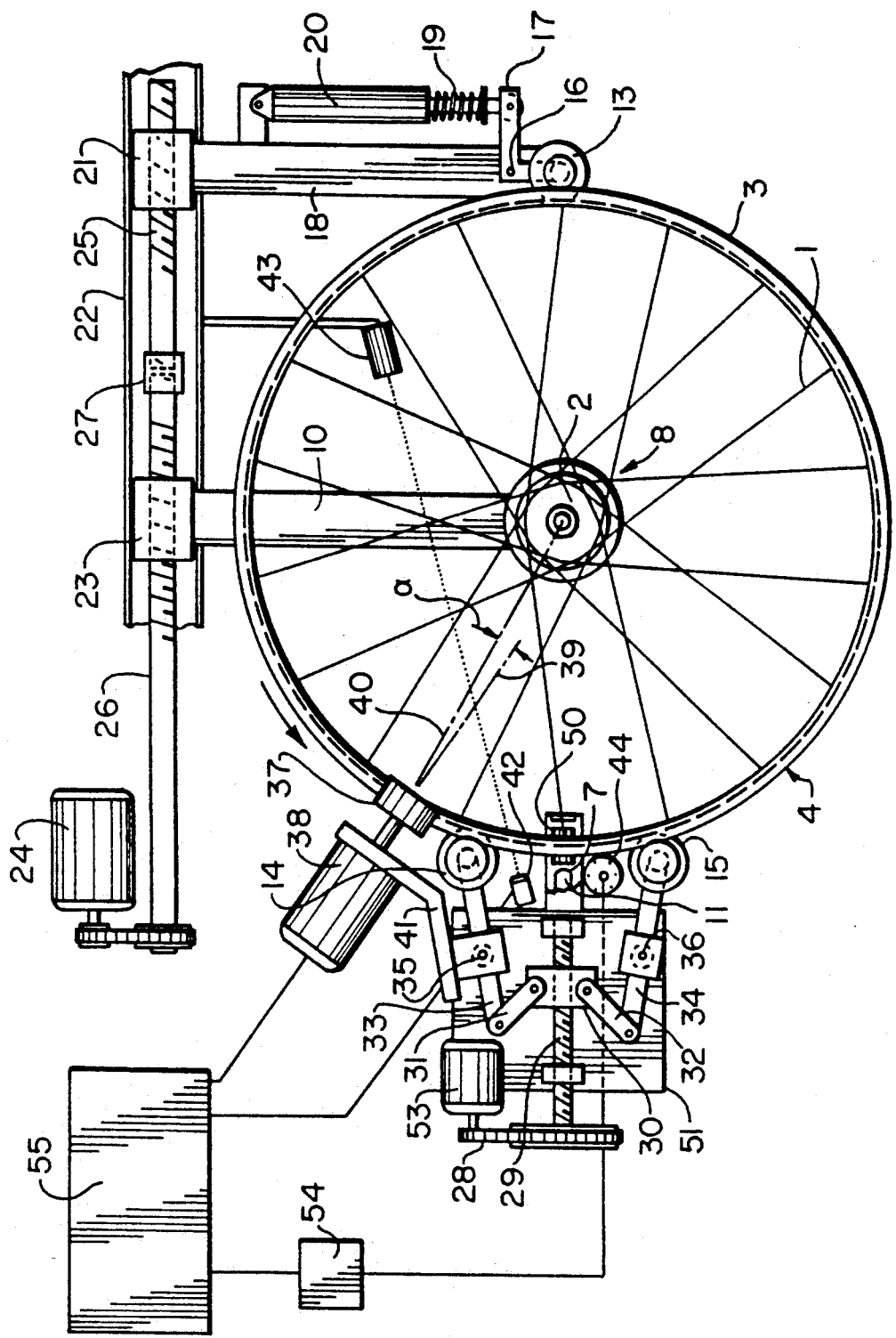
FIG. 2 is a plan view of the apparatus of FIG. 1 illustrating a number of other parts.

For rotating the rim 3 about its axis in order to successively position the various nipple holes 6 in front of the screw driver 11, there are provided drive means consisting of two rim rollers 37, 37 positioned one above the other and adapted to engage opposite sides of the rim 3 and being rotatably drivable by a common electric motor 38. The rim rollers 37 as shown in particular in FIG. 2, are positioned a small distance from the screw driver 11 so that only a small length of arc of the rim 3 is present between the rim rollers 37 and the screw driver 11. The rim rollers 37 are driven in such direction that in that point they move the rim 3 in the direction to the screw driver 11 as is shown by the arrow in the drawing. The rim rollers 37 are further arranged such in relation to the respective rim 3 that a plane through the rim rollers 37 makes a small angle with the tangent plane of the rim 3 at the position of the rim rollers 37 or, in other words, the axis 39 of the rim rollers 37 makes a small angle with the corresponding radial line 40 through the hub support 8 and the rim rollers 37. This small angle α, which may be 5° to 10°, has such a direction that this angular off-set creates slip between the rim rollers 37 and the rim 3 which is directed outwardly of the rim 3 and consequently the rim 3 is urged substantially in the direction to the screw driver 11 and the lateral rim support rollers 14 and 15 thereby ensuring a proper abutment of the rim 3 to the rim support rollers 14 and 15.

To maintain the right position of the rim rollers 37 with respect to rims 3 of different diameters, the drive unit of electric motor 38 and rim rollers 37 is connected to the lever 33 of the rim support roller 14 by a carrier 41. When the apparatus is adjusted, the drive unit is displaced in such a way that the angle α with respect to the radial line 40 through the hub support 8 and the rim rollers 37 is maintained.

The apparatus further comprises means for determining the position of the several nipple hole 6 in the rim 3 and for controlling the electric motor 38 of the rim rollers 37 such that the nipple holes 6 are successively positioned in front of the screw driver 11. These measuring means preferably include a charge coupled device (CCD), and in this embodiment a CCD-camera 42 cooperates with a light source 43 to detect the several nipple holes 6 in the rim wherein the position of each nipple hole 6 both in the axial direction and in the circumferential direction of the rim 3 may be measured and registrated. This registration is done in relation to a reference point which, in most cases, is formed by the valve hole 54 which is present in each rim and which has a greater diameter than the nipple holes 6. The distance of displacement of the rim 3 in the circumferential direction is further registered by means of a measuring wheel 44 which may roll on the rim circumference of the rim 3 and which cooperates with a pulse counter 54 and is consequently able to determine both the circumference of the rim bed of each rim 3 absolutely or relative to a nominal size, and is adapted to measure in cooperation with the CCD-camera 42 the spacing between the several nipple holes 6. These values may be registered in a so called measuring round in which the data, which is important for positioning the various nipple holes 6, is filed into the memory and subsequently each nipple hole 6 is allowed to be positioned in front of the screw driver 11 in order to have a nipple 7 screwed onto a spoke 1. The CCD-camera 42 determines each time when a respective nipple hole 6 is passing, while the pulse counter 54 of the wheel 44 determines what distance the rim 3 should be rotated further in order to get this nipple hole 6 in front of the screw driver 11. The CCD-camera 42 and the measuring wheel 44 as well as the motor 38 of the rim rollers 37 are connected to control means in the form of a computer 55 with which the measuring signals are converted into control signals for the motor.

Since it is desired to obtain a high working speed, the rim 3 is subjected to a considerable acceleration and deceleration by the rim rollers 37. However, since the rim rollers 14, 15, 50 are arranged at a small distance from both the screw driver 11 and the measuring means formed by the CCD-camera 42 and the wheel 44, the dynamic disturbances hardly influence the positioning of the holes, and also shape variations of the rim 3 do not lead to undesired position errors.

FIG. 1 further shows that a nipple nozzle 45 is displaceable between a rear position, in which a nipple supply opening 46 connects to the end of a hose 47 which extends from a nipple container 48 and in which rear position of the nipple nozzle 45 a nipple 7 may be supplied to the nozzle 45 by means of pressurized air, and a front position, in which the supplied nipple 7 may be screwed onto the corresponding spoke by means of the screw driver 11. A set back spring 49 ensures that when the screw driver 11 is withdrawn the nipple nozzle 45 moves along to the rear position. In this manner the hose 47 does not have to move together with the nipple nozzle 45 so that disturbances of the movements of the nipple nozzle 45 by the hose 47 are not possible anymore.

In this embodiment of the apparatus the spokes, which have already been inserted through the respective flanges 5 of the hub 2, are held by hand in front of the corresponding nipple hole 6, for which purpose a positioning means (not shown) may be provided in order to hold the spoke 1 in the right position, which positioning means may also be equipped with a switch for actuating the electric motor 12 of the screw driver 11 as soon as a spoke 1 is placed in front of the nipple hole 6. Consequently, the screw driver 11 is only driven when necessary.

From the foregoing it will be clear that there is provided an apparatus for mounting spokes between a hub and rim of a spoke wheel with which the nipple holes of a rim are positioned in front of one or more screw drivers in a quick and accurate manner.

The invention is not restricted to the embodiment shown in the drawing and described above, which may be varied in different manners within the scope of the invention. It is for instance possible to make any axial corrections between the rim 3 and the screw driver 11 not by displacing the rim at the position of the screw driver in the axial direction, but by having the screw driver rotated about an axis which is slightly spaced from the rim edge. As a result, there is not only obtained a height correction of the screw driver 11 in relation to the rim 3, but also a rotation of the screw driver 11 which is such that the screw driver becomes fully or at least more aligned with the spokes 1 which are at an angle to a transverse plane through the rim. Furthermore, it would be possible that the measuring means only include a CCD-camera which then determines the position of the nipple hole through which the nipple should be inserted at that time. In this case a measuring round would not be required for determining the position of the several nipple holes because this determination of the position of each nipple hole is taking place just prior to the insertion of the nipple. A further modification to the apparatus may consist of a different arrangement of the rim support rollers and rim drive rollers, wherein for instance the rim drive rollers may be arranged above and below the screw driver, while one rim support roller is positioned just beside the screw driver and two rim support rollers are arranged on the side of the rim remote from the screw driver.

I claim:

1. Apparatus for mounting spokes (1) between a hub (2) and rim (3) of a spoke wheel (4) and attaching nipples into the spokes through respective nipple holes in the rim, comprising a hub support (8) for rotatably supporting the hub, rim support rollers (13, 14, 15) for supporting the rim (3) concentrically around its axis, drive means (37, 38) for rotating the rim (3) about its axis, at least a rotatably driven, substantially radially directed screw driver (11) for screwing nipples (7) onto corresponding spokes (1) through the respective nipple holes (6) in the rim (3), measuring means (42, 44) for determining the position of the nipple holes (6) in the rim (3) and providing a measuring signal representative of that position, and control means (55) for receiving the measuring signal and controlling the drive means (37, 38) such that the nipple holes (6) are successively positioned in front of the screw driver (11), wherein the drive means (37, 38) for the rim (3) is arranged less than 90° from the screw driver (11) along an arc defined by the rotating rim.

2. Apparatus according to claim 1, wherein the drive means (37, 38) is adapted to drive the rim (3) in a direction to the screw driver (11).

3. Apparatus according to claim 1, wherein the drive means (37, 38) includes two opposed rim rollers (37, 37) adapted to engage opposite sides of the rim (3).

4. Apparatus according to claim 2, wherein the axis of the rim rollers (37, 37) makes an angle $\alpha$ with a radial line (40) through the hub support (8) and the rim rollers (37, 37) lying on the side of the screw driver.

5. Apparatus according to claim 4, wherein the drive means (37, 38) is adjustable such that the axis of the drive rollers is kept at the same angle to said radial line with different rim diameters.

6. Apparatus according to claim 1, wherein the measuring means include a CCD-camera (42) arranged adjacent the screw driver (11) and a measuring wheel (44) connected to a pulse counter 54 and adapted to engage the rim circumference and the axis of which extends parallel to the hub support (8).

7. Apparatus according to claim 1, wherein the measuring means include a CCD-camera (42) of which the measuring field or line coincides with the axis of the screw driver (11).

8. Apparatus according to claim 1, wherein one (50) of the rim support rollers, which supports the rim (3) at least axially, is arranged at the position of the screw driver (11).

9. Apparatus according to claim 1, wherein the hub support (8) and at least one rim support roller (13) positioned opposite to the screw driver (11) are adjustable relative to the screw driver (11) to adapt to the diameter of the respective rim (3), which adjustment takes place by means of a motor driven screw spindle (25, 26) having its engagement with an adjusting nut (21) of the at least one rim support roller (13) which has a pitch which is twice the pitch of its engagement with an adjusting nut (23) of the hub support (8).

10. Apparatus according to claim 1, wherein the screw driver (11) cooperates with a nipple nozzle (45) with which a nipple (7) is positioned in front of the screw driver (11) and, for this purpose, connecting to a stationary nipple supply means (48) in a retracted position.

* * * * *